United States Patent [19]

Kasai et al.

[11] Patent Number: 4,629,045
[45] Date of Patent: Dec. 16, 1986

[54] AUTOMATIC CLUTCH CONTROL SYSTEM

[75] Inventors: Hitoshi Kasai, Kawasaki; Noriaki Ogawa, Tokyo; Toshihiro Hattori, Ayase; Masaki Ishihara, Fujisawa; Makoto Uriuhara, Yokohama, all of Japan

[73] Assignees: Fujitsu Limited, Kawasaki; Isuzu Motors Limited, Tokyo, both of Japan

[21] Appl. No.: 674,832

[22] Filed: Nov. 26, 1984

[51] Int. Cl.4 .......................................... B60K 41/28
[52] U.S. Cl. ................................ 192/0.052; 192/3.58
[58] Field of Search ................ 192/0.052, 0.075, 3.58, 192/70.25, 111 A, 111 R; 364/151, 424.1; 303/92

[56] References Cited

U.S. PATENT DOCUMENTS 4,023,660  5/1977  Dickinson ................... 192/111 A X
4,440,279  4/1984  Schreiner .................... 192/111 A X Primary Examiner—George H. Krizmanich
Attorney, Agent, or Firm—Staas & Halsey

[57] ABSTRACT

An automatic clutch control system including a clutch, a clutch actuator for controlling a clutch stroke, a plurality of solenoid valves for controlling the clutch actuator, a clutch stroke sensor for measuring the clutch stroke, a control unit for feeding back a stroke signal detected by the clutch stroke sensor and for controlling the solenoid valves to control clutch engagement and disengagement. The control unit includes a learning control section for storing a full clutch engagement point upon saturation of the stroke signal in a clutch engagement operation and storing clutch contact point upon start of rotation of an engine input shaft in a clutch engagement operation following a clutch disengagement operation. Based on the full clutch engagement point and clutch contact point, the control unit judges a clutch operation range for control of clutch engagement and disengagement.

5 Claims, 14 Drawing Figures

AUTOMATIC CLUTCH CONTROL SYSTEM

BACKGROUND OF THE INVENTION

The present invention relates to an automatic clutch control system for use in automobiles, more particularly to a method and apparatus, using a microcomputer, for controlling a clutch stroke through a clutch actuator.

The present invention judges the clutch position and obtains a clutch contact point and a full clutch engagement point and, thereby automatically determines the clutch operation range by using a so-called learning control.

The present invention is advantageously used, for example, for automobiles having conventional dry-type single-plate clutches used in conjunction with sliding mesh-type automatic transmissions.

Automatic clutch control systems using microcomputers have already been proposed, such as in Japanese Examined Patent Publication (Kokoku) No. 50-12648 and Japanese Unexamined Patent Publication (Kokai) No. 52-5117. In these systems, a microcomputer is used to control the operation of solenoid valves under a predetermined program stored in the microcomputer, the operation of an actuator is controlled in accordance with the operation of the solenoid valves, and the movement of the clutches (for example, dry-type single-plate clutches), i.e., clutch engagement, clutch slip, and clutch disengagement, is controlled by the actuator through some link mechanism. Japanese Examined Patent Publication No. 50-12648 further discloses a method for gradually changing the clutch engagement condition in proportion to the increment of the engine rotational speed, while Japanese Unexamined Patent Publication No. 52-5117 discloses a method for changing the clutch engagement speed in response to the engine rotational speed.

In general, the clutch operation range, determined by the actuator stroke, differs for each individual automobile due to manufacturing variations, wear in use, and the like. Conventional automatic clutch control systems do not consider the above-mentioned differences in the clutch operation range.

SUMMARY OF THE INVENTION

The primary object of the present invention is to provide an automatic clutch control system, for use in automobiles, using a microcomputer and eliminating the disadvantages in the prior art.

Another object of the present invention is to provide an automatic clutch control system enabling highly precise, easy, and automatic judgement of the clutch operation range by learning control under various driving conditions.

Still another object of the present invention is to provide an automatic clutch control system enabling use of conventional dry-type single-plate clutches and sliding-mesh-type transmissions.

In accordance with the present invention, there is provided an automatic clutch control system including a clutch a, clutch actuator for controlling a clutch stroke, a plurality of solenoid valves for controlling the clutch actuator, a clutch stroke sensor for measuring the clutch stroke, a control unit for feeding back a stroke signal detected by the clutch stroke sensor and for controlling clutch engagement and disengagement based on control of the solenoid valves. The control unit includes a learning control function, based on which it stores a full clutch engagement point upon saturation of the stroke signal in a clutch engagement operation and a clutch contact point upon start of rotation of an engine input shaft in a clutch engagement operation following a clutch disengagement operation. Based on the full clutch engagement point and the clutch contact point, the control unit judges a clutch operation range for control of clutch engagement and disengagement.

In accordance with the present invention, it is possible to effectively control the clutch stroke thereby improving operability compared with conventional automatic transmissions and to drive easily under all driving conditions.

BRIEF DESCRIPTION OF THE DRAWINGS

FIGS. 7A to 9B are graphs showing the relation between the absolute position on an absolute ordinate and a relative position on a relative ordinate of the actuator stroke and the clutch engagement stroke.

DESCRIPTION OF THE PREFERRED EMBODIMENTS

Before describing the preferred embodiments of the present invention, an explanation will be given of a conventional automatic clutch control system for a semiautomatic transmission using a dry-type single-plate clutch and hydraulic control actuator.

Figure 1:
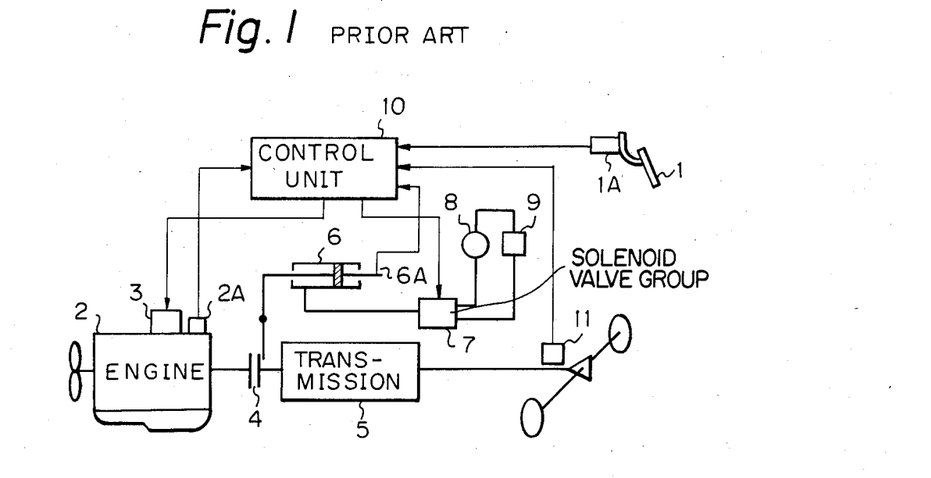
FIG. 1 is a schematic block diagram of a conventional automatic clutch control system.

Referring to FIG. 1, reference numeral 1 is an accelerator pedal, 1A an accelerator pedal sensor, 2 an engine, 2A an engine speed sensor, 3 a throttle actuator, 4 a clutch, 5 a transmission, 6 a clutch actuator, 6A a clutch stroke sensor, 7 a solenoid valve group, 8 an oil pump, 9 an oil tank, 10 a control unit, and 11 an automobile speed sensor.

The control unit 10, constituted by a microcomputer, controls the throttle actuator 3 and the solenoid valve group 7 based on a signal transmitted from the accelerator pedal sensor 1A, a signal transmitted from the engine speed sensor 2A, a signal transmitted from the cluth stroke sensor 6A, and a signal transmitted from the automobile speed sensor 11. The control unit 10 also feeds back the stroke signal transmitted from the clutch stroke sensor 6A to control the opening of the solenoid valve group 7 for engagement, slip, or disengagement of the clutch based on the clutch engagement speed, as defined by the approach of the clutch engagement start point, clutch engagement, clutch slip, clutch disengagement, change in engine rotational speed, automobile speed, and other driving conditions. When the solenoid valve group 7 is controlled, the clutch actuator 6 is activated by its output. Thus, the clutch is engaged, slipped, or disengaged corresponding to the motion of the solenoid valve group 7. As mentioned above, in an automatic clutch control system, the stroke signal transmitted from the clutch stroke sensor 6A is fed back to the control unit 10, whereby the clutch engagement speed and the clutch operation range are controlled by the control unit 10.

In the above-mentioned automatic clutch control system, the effective actuator stroke, corresponding to the distance from the clutch contact point to the full clutch engagement point, is between a quarter and a half of the full actuator stroke. In other words, it is necessary to set the full actuator stroke to be two to four times the effective actuator stroke. The reason for this is the necessity for ensuring full engagement and disengagement of the clutch regardless of the differences in individual clutch systems.

In this system, however, the full actuator stroke is too large compared with the effective actuator stroke. Consequently, longer clutch operation time, reduced processing efficiency of the microcomputer, and poor operability as felt by the driver, are experienced.

An automatic clutch control system according to the present invention will now be explained in detail. As explained above, the automatic clutch control system according to the present invention can be used with conventional dry-type single-plate clutches and sliding-mesh-type transmissions. In the present invention, the change lever used in semiautomatic transmissions is eliminated and a transmission actuator added instead. The clutch and transmission actuator are controlled by a microcomputer controller. The clutch control system according to the present invention is a fully automatic transmission using a conventional clutch and transmission.

Figure 2:
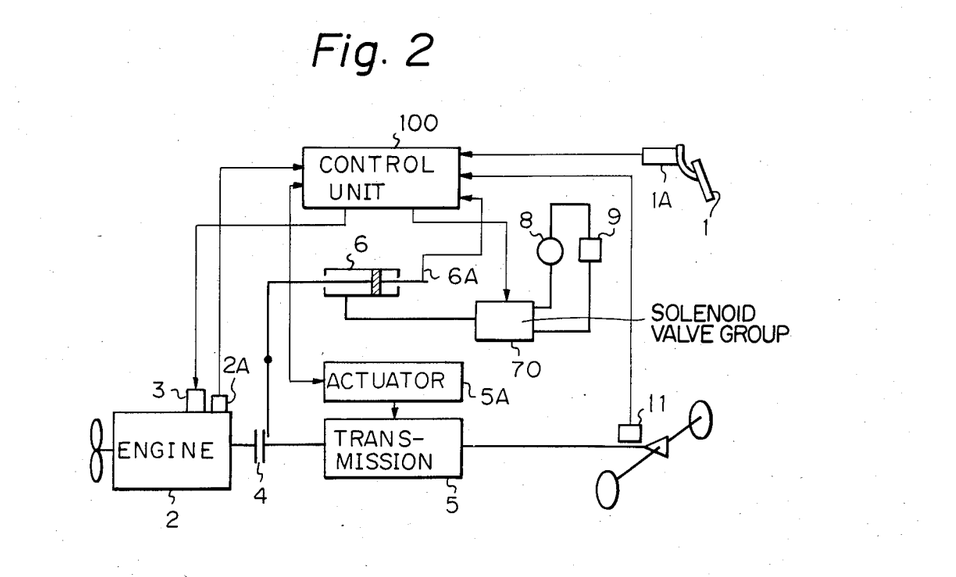
FIG. 2 is a schematic block diagram of an automatic clutch control system according to the present invention.

Referring to FIG. 2, the automatic clutch control system is constituted by the same components as shown in FIG. 1, except for a control unit 100, a solenoid valve group 70, and an actuator 5A. Components which are the same as those in FIG. 1 are indicated by the same reference numerals.

Figure 3:
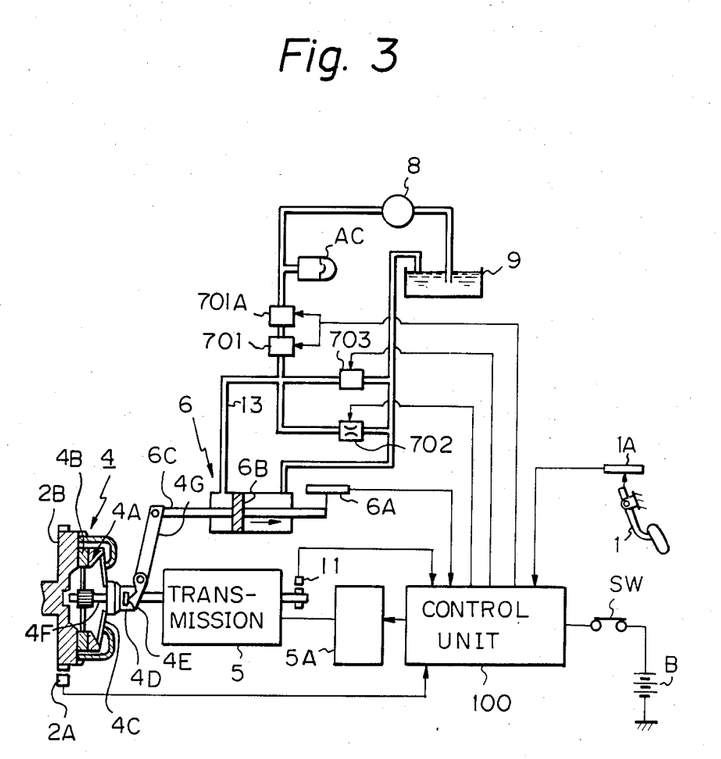
FIG. 3 is a schematic block diagram showing a hydraulic control circuit including the solenoid valves controlled by the control unit shown in FIG. 2.

Referring to FIG. 3, the clutch is constituted by clutch pressure plate 4A, clutch disk 4B, diaphragm spring 4C, clutch release bearing 4D, clutch release lever 4E, clutch shaft 4F, and lever 4G. Reference numeral 2B is an engine flywheel; 701, 701A, 702, and 703 solenoid valves in the solenoid valve group 70; B a battery; and SW is a power switch associated with an ignition switch.

The clutch 4 is controlled by controlling the operation of the solenoid valves 701, 701A, 702, and 703 using the control unit 100. The control unit 100 consists of a microcomputer storing a program with respect to driving conditions. When the solenoid valves 701 and 701A, for example, are actuated by the control unit 100, pressurized fluid is supplied to the oil cylinder 6 from the oil pump 8. The piston 6B of the oil cylinder 6 is thus moved toward the right as indicated by the arrow line to disengage the clutch disk 4B. When the solenoid valves 702 and 703 are actuated by the control unit 100, the pressurized fluid is exhausted from the oil cylinder 6. The piston 6B thus moves in the reverse direction due to the action of a return spring (not shown) to disengage the clutch disk 4B.

The resultant data of movement is detected by the clutch stroke sensor 6A, consisting of a potentiometer, and the detected voltage of the potentiometer is fed back as a stroke signal $S_s$ to the control unit 100.

Figure 4:
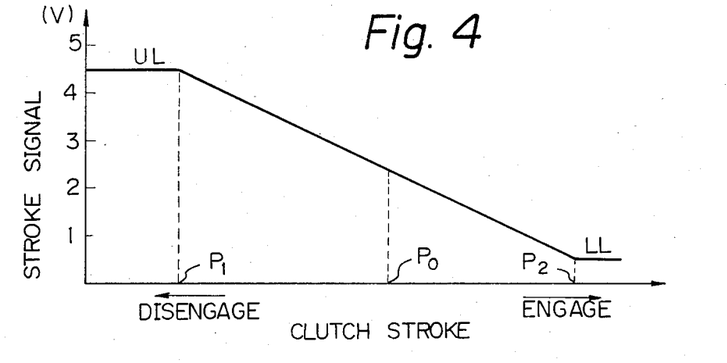
FIG. 4 is a graph showing the relation between a clutch stroke signal and an actuator (clutch) stroke.

Referring to FIG. 4, the ordinate indicates the stroke signal $S_s$ (V) and the abscissa the actuator (clutch) stroke (mm). An upper limit value UL and lower limit value LL are determined for the stroke signal $S_s$ detected by the clutch stroke sensor 6A according to the present invention. On the abscissa, the arrow to the right direction indicates the clutch engagement and the arrow to the left direction indicates the clutch disengagement by the motion of the actuator. The range between point $P_1$ and $P_2$ indicates the effective potentiometer range, in other words, the effective clutch operation range. As can be understood from the graph, the stroke signal voltage is proportional to the actuator (clutch) stroke.

Figure 5:
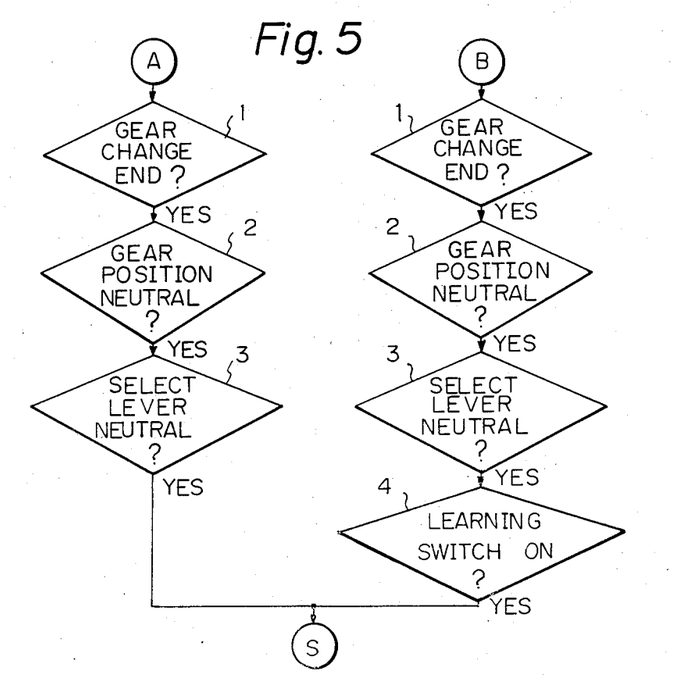
FIG. 5 is a flow chart showing the conditions for starting learning control.
Figure 6A:
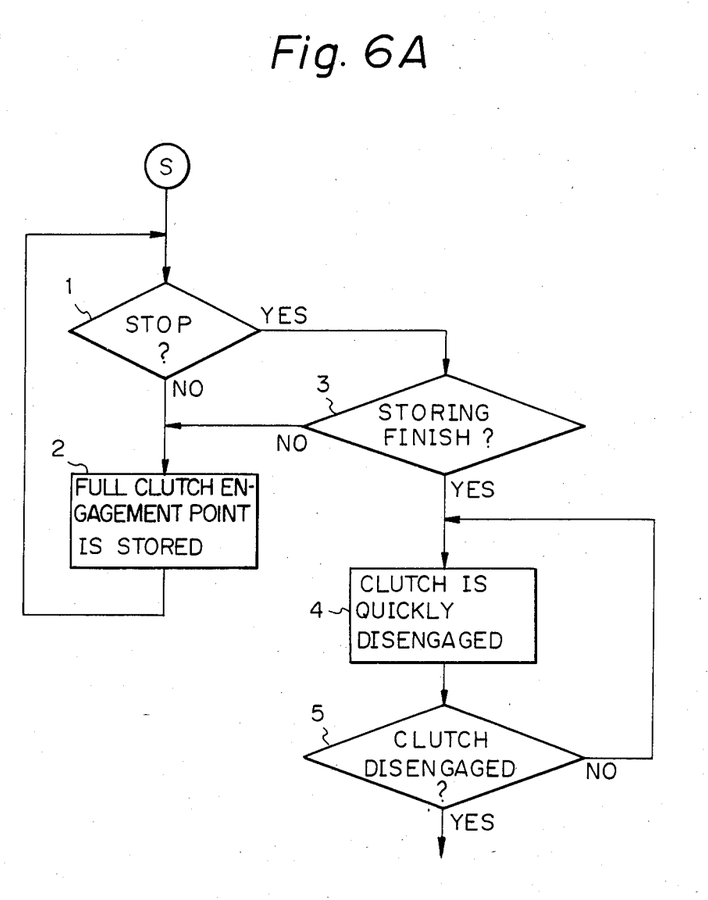
FIGS. 6A and 6B are flow charts showing the procedure of learning control.
Figure 6B:
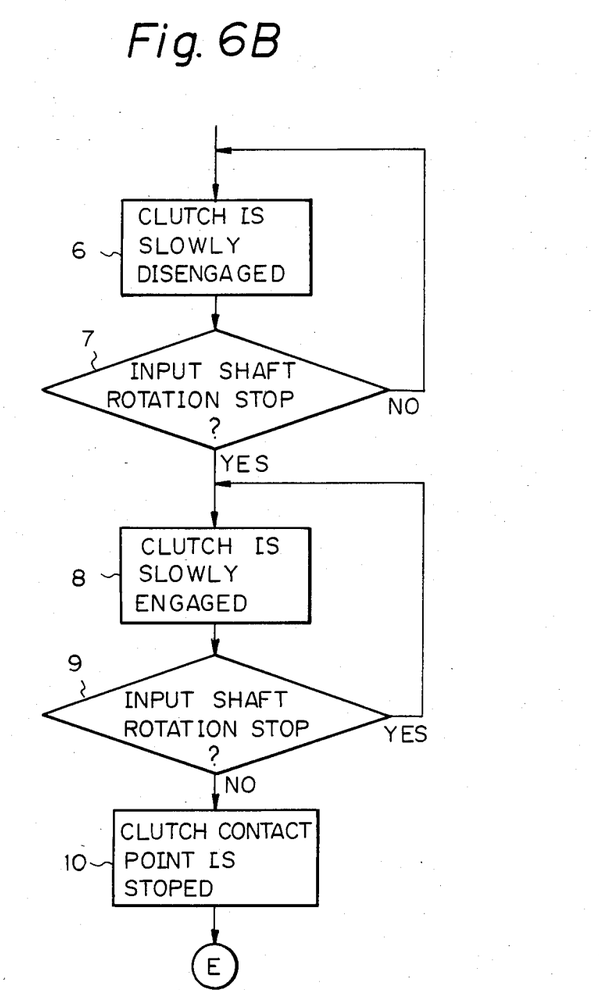

FIGS. 5, 6A, and 6B are flow charts of the processing procedure based on learning control. The entire procedure is effected by the control unit 100 within the clutch operation range shown in FIG. 4.

As is well known by persons skilled in the art, learning control is a method in which differences in individual systems, caused by manufacturing variations, assembly precision, wear in use, ambient conditions, etc., are detected using various sensors provided in the systems, operation programs and data stored in the systems are updated based on the detected actual data, and various outputs are adjusted to control the system based on the updated data for optimum driving conditions.

The flow chart of FIG. 5 indicates the conditions for the start of learning control. Learning control is started when the automobile is stopped or running by inertia. The flow chart shows two flows: Flow A for automatic learning control and flow B for learning control activated by the driver using a special switch. Flows A and B are basically identical.

The control unit 100 checks for the following: At step 1, completion of a gear change of the transmission 5; at step 2, it checks that the gear position is "neutral"; and at step 3, it checks that the select lever is at neutral. In the case of flow B, at step 4, the control unit 100 checks that the learning control switch is turned on.

The flow charts of FIGS. 6A and 6B indicate the steps of the learning control. These steps are started after the starting process shown in FIG. 5. First, at step 1, the state of the automobile is checked. If the automobile is at a stop, the routine directly proceeds to step 3. If the automobile is running by inertia, at step 2, a clutch engagement command is sent to the actuator and a "quick" clutch engagement operation is performed. The full clutch engagement point is determined based on the lower saturation point of the stroke signal shown in FIG. 4 and stored in the memory. The routine then returns to step 1.

At step 3, it is checked whether the full clutch engagement point is properly stored in the memory. If not, the routine returns to step 2. If it is, at step 4, a "quick" clutch disengagement operation is performed through the actuator by a clutch disengagement command. At step 5, the clutch disengagement is checked. If not disengaged, the routine returns to step 4. If disengaged, at step 6, a "slow" disengagement operation is performed. At step 7, it is checked whether the input shaft connected between the clutch and the transmission has stopped rotating. If it has not, the routine returns to step 6. If it has, at step 8, a "slow" clutch engagement operation is performed. At step 9, it is checked if the input shaft is rotating. If it is not, the routine returns to step 8.

If it is, at step 10, the clutch contact point is determined by the beginning of rotation of the input shaft and stored in the memory.

As mentioned above, the full clutch engagement point and the clutch contact point are determined by using learning control, and the effective clutch operation range is obtained based thereon.

FIGS. 7A to 9B are used for explaining the relation between an absolute position on an absolute ordinate and a relative position on a relative ordinate of the actuator stroke and the clutch engagement. "Absolute position" means an actually measured value (V) detected by the stroke signal shown in FIG. 4 and is designated "CLUTCH:AD". "Relative position" means a converted value of the actual measured value for use in learning control and is designated "CLUTCH". As explained below, learning control based on the absolute value is converted to learning control based on the relative value. By using the relative value, control programs can be simplified and the calculation time can be considerably reduced.

In FIGS. 7A to 9B, "CUT:LEARN" is the absolute value (V) of the clutch contact point obtained from step 10 of the learning control procedure shown in FIGS. 6A and 6B, and "CNCT:LEARN" is the absolute value of the full clutch engagement point obtained from step 3 of the learning control procedure shown in FIGS. 6A and 6B. "CNCT:STRT" is the relative value of the clutch contact point of the learning control, "STRK:DFLT" is a back-up value of the actuator stroke on the relative ordinate, and "CUT:DFLT" is the back-up value of the clutch contact point on the absolute ordinate. The back-up value of the actuator stroke is the relative distance between "CNCT:STRT" and "CNCT:LEARN" on the relative ordinate.

Figure 7A:
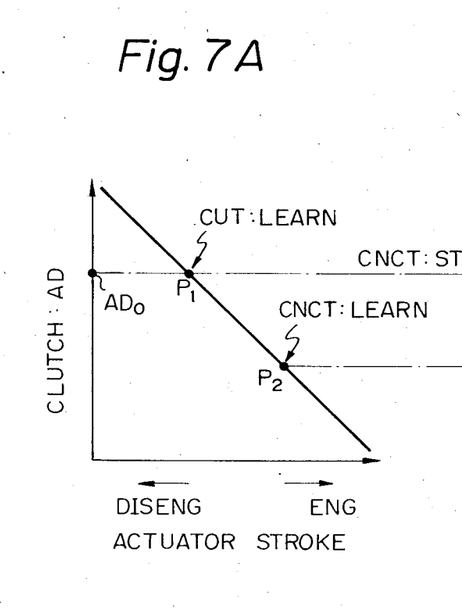
Figure 7B:
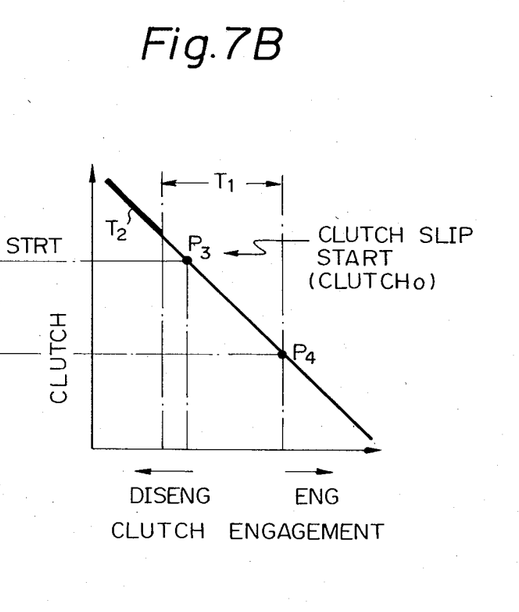
Figures 8A, 8B:
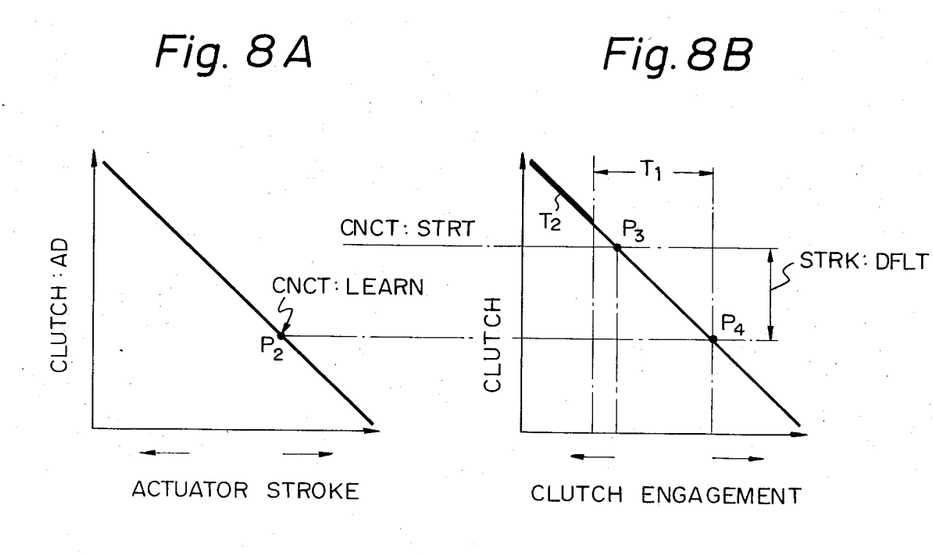
Figures 9A, 9B:
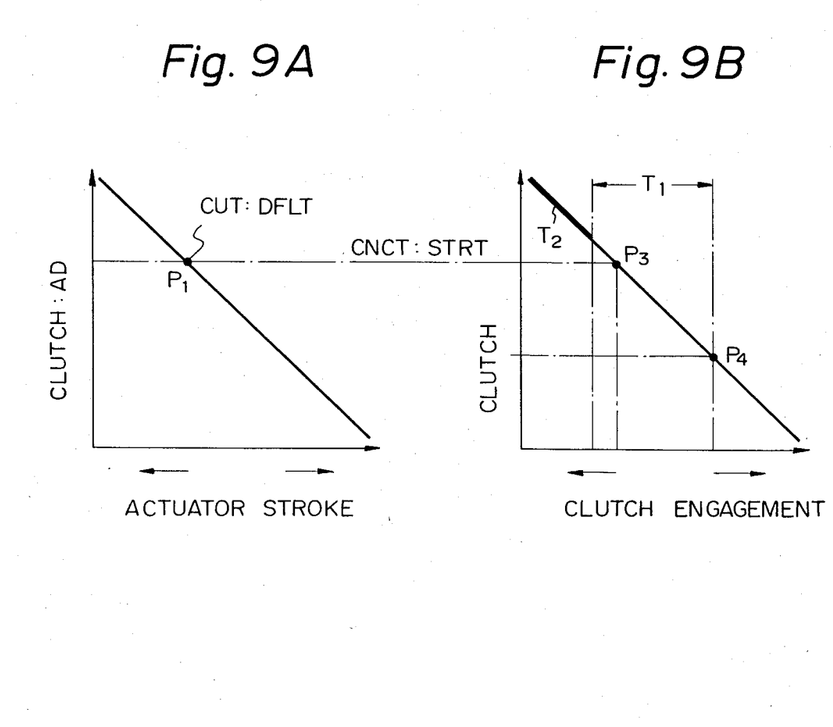

In FIGS. 7A, 8A, and 9A, the ordinate is an absolute ordinate indicating "CLUTCH:AD", and the abscissa indicates the actuator stroke. The arrow to the right direction indicates the direction of the clutch engagement, and the arrow to the left direction indicates the direction of the clutch disengagement. In FIGS. 7B, 8B, and 9B, the ordinate is a relative ordinate indicating "CLUTCH", and the abscissa indicates the clutch engagement. As mentioned above, the arrow to the right direction indicates the direction of the clutch engagement, and the arrow to the left direction indicates the direction of the clutch disengagement. The range between the chain dotted lines is the effective clutch operation range.

FIGS. 7A and 7B show a first case where learning control is performed without any trouble. The trouble could be, for example, battery failure. Both "CUT:LEARN"$\neq$0 (point $P_1$) and "CNCT:LEARN"$\neq$0 (point $P_2$) can be obtained by learning control; therefore, the relative position (CLUTCH$_o$) on the "CLUTCH" ordinate can be obtained by the following formula:

$$(CLUTCH_o) = (CLUTCH:AD_o) - (CUT:LEARN) + (CNCT:STRT) \quad (1)$$

where (CLUTCH:AD$_o$) indicates the absolute position by actual measurement on the (CLUTCH:AD) ordinate. As obvious from formula (1), when (CUT:LEARN) on the absolute ordinate is equal to (CNCT:STRT) on the relative ordinate, (CLUTCH$_o$) is equal to (CLUTCH:AD$_o$).

FIGS. 8A and 8B show a second case where "CUT:LEARN" cannot be obtained by learning control, but "CNCT:LEARN" can. In the case of "CUT:LEARN"$\neq$0 and "CNCT:LEARN"$\neq$0 (point $P_2$), the relative position (CLUTCH$_o$) on the "CLUTCH" ordinate can be obtained by the following formula:

$$(CLUTCH_o) = (CLUTCH:AD_o) - (CNCT:LEARN + STRK:DFLT) + (CNCT:STRT) \quad (2)$$

As obvious from formula (2), (CUT:LEARN) in formula (1) is equal to (CNCT:LEARN+STRK:DFLT).

FIGS. 9A and 9B show a third case where both "CUT:LEARN" and "CNCT:LEARN" cannot be obtained by learning control. In the case of "CUT:LEARN"$\neq$0 and "CNCT:LEARN"=0, the relative position (CLUTCH$_o$) on the "CLUTCH" ordinate can be obtained by the following formula:

$$(CLUTCH_o) = (CLUTCH:AD_o) - (CUT:DFLT) + (CNCT:STRT) \quad (3)$$

As obvious from formula (3), (CUT:LEARN) in formula (1) is equal to (CUT:DFLT).

As mentioned above, the range $T_1$ between the chain dotted lines shown in FIGS. 7B, 8B, and 9B indicate the effective clutch operation range. Point $P_3$ in the range $T_1$ indicates the clutch contact point, i.e., start of clutch slip, and point $P_4$ at the end of the range $T_1$ indicates the full clutch engagement point, i.e., the point $P_2$ on the absolute ordinate. The range $T_2$ indicated by the thick line is the clutch disengagement zone. The effective clutch operation range is determined within the range $T_1$ by using learning control.

Briefly, by using learning control, the effective clutch operation range is judged based on the clutch contact point obtained by the absolute position and the relative position. When the clutch contact point cannot be obtained, the effective clutch operation range is judged based on the back-up value of the stroke (STRK:DFLT) and the clutch contact point (CUT:DFLT).

Figure 10:
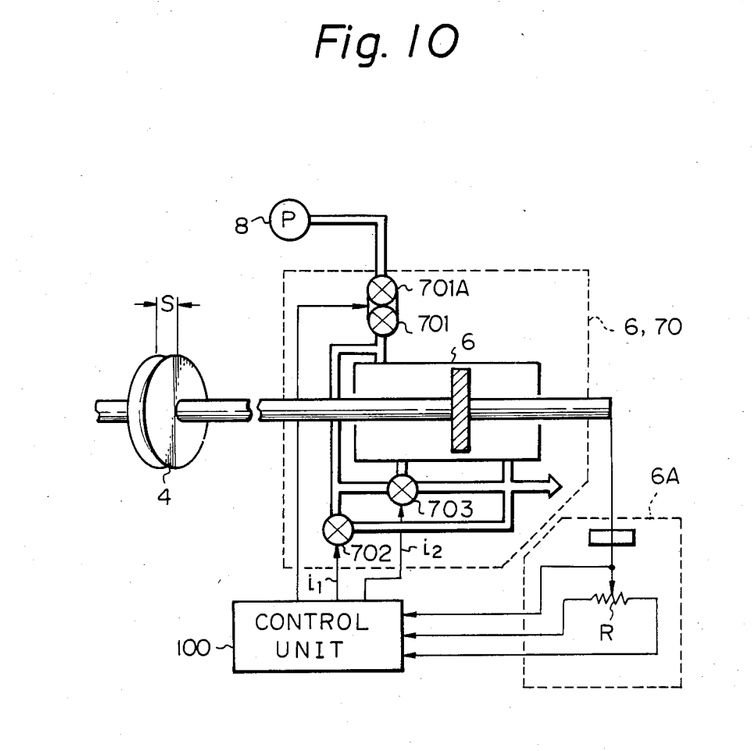
FIG. 10 is a schematic block diagram showing the automatic clutch control system and the clutch stroke sensor.

FIG. 10 shows the detailed structure of the clutch stroke sensor 6A shown in FIG. 2 and FIG. 3. As obvious from the drawing, the clutch stroke sensor is a potentiometer. Depending on the motion of the actuator piston rod, different voltages are obtained from the output across the resistance R as the stroke signal $S_s$.

We claim:

1. An automatic clutch control system, comprising:
   a clutch having a full clutch engagement point and a clutch contact point;
   a clutch actuator for controlling a clutch stroke;
   a plurality of solenoid valves for controlling said clutch actuator;
   clutch stroke sensor means for measuring said clutch stroke and for detecting the full clutch engagement point and the clutch contact point in said clutch stroke;
   control means, for feeding back a stroke signal detected by said clutch stroke sensor and for controlling the solenoid valves to control clutch engagement and disengagement, including learning control means, for storing the full clutch engagement point upon saturation of the stroke signal in a clutch engagement operation and storing a clutch contact point upon start of rotation of a transmission input shaft in a clutch engagement operation following a clutch disengagement operation and for judging a clutch operation range, for control of clutch engagement and disengagement, based on the full clutch engagement point and the clutch contact point.

2. A method for controlling a clutch actuator, to operate a clutch having a clutch stroke, in an automatic transmission system for automobiles, comprising the steps of:
(a) detecting an accelerator position by an accelerator position sensor, an engine rotational speed by an engine speed sensor, a clutch stroke by a clutch stroke sensor provided on a clutch actuator, a change lever position by a lever position sensor, an input shaft rotational speed by an input shaft rotational speed sensor, and a transmission gear position by a transmission gear position sensor;
(b) performing learning control with a microcomputer by
  (1) obtaining a full clutch engagement point in a clutch engagement operation based on a saturated clutch stroke signal and then obtaining a clutch contact point in a clutch engagement operation following a clutch disengagement operation and
  (2) judging an effective clutch operation range based on said full clutch engagement point and clutch contact point; and
(c) controlling the clutch stroke based on said effective clutch operation range.

3. A method according to claim 2, wherein said learning control step comprises judging the effective clutch operation range based on a clutch stroke back-up value when said full clutch engagement point and clutch contact point are not obtained.

4. An apparatus, including a microcomputer, for controlling a clutch actuator, to operate a clutch having a clutch stroke, in an automatic transmission system for automobiles, comprising:
means for detecting an accelerator position, an engine rotational speed, a clutch stroke, a change lever position, an input shaft rotational speed, and a transmission gear position;
means for performing learning control, including
  means for obtaining a full clutch engagement point by a clutch engagement operation based on a saturated clutch stroke signal and then obtaining a clutch contact point by a clutch engagement operation following a clutch disengagement operation and
  means for judging an effective clutch operation range based on said full clutch engagement point and clutch contact point; and
means for controlling a clutch stroke based on said effective clutch operation range.

5. An apparatus according to claim 4, wherein the microcomputer comprises said learning control means and said controlling means.

* * * * *

UNITED STATES PATENT AND TRADEMARK OFFICE
CERTIFICATE OF CORRECTION

PATENT NO. : 4,629,045

DATED : December 16, 1986

INVENTOR(S) : Kasai et al.

It is certified that error appears in the above-identified patent and that said Letters Patent is hereby corrected as shown below:

Front Page [57] ABSTRACT, line 11, "clutch" should be --a clutch--.

Column 6, line 4, "≠0 and" should be ---=0 and--;

line 16, "≠0 and" should be ---=0 and--.

Signed and Sealed this

Tenth Day of March, 1987

Attest:

DONALD J. QUIGG

Attesting Officer

Commissioner of Patents and Trademarks